(12) United States Patent
Georgantas et al.

(10) Patent No.: US 9,065,537 B2
(45) Date of Patent: Jun. 23, 2015

(54) METHOD AND SYSTEM FOR CALIBRATING A MULTI-MODE, MULTI-STANDARD TRANSMITTER AND RECEIVER

(75) Inventors: Theodore Georgantas, Chaidari (GR); Stamatios Alexandros Bouras, Ilioupolis (GR); Christos Kokozidis, Athens (GR)

(73) Assignee: Broadcom Corporation, Irvine, CA (US)

( * ) Notice: Subject to any disclaimer, the term of this patent is extended or adjusted under 35 U.S.C. 154(b) by 1015 days.

(21) Appl. No.: 12/427,564

(22) Filed: Apr. 21, 2009

(65) Prior Publication Data

US 2009/0227214 A1  Sep. 10, 2009

Related U.S. Application Data

(63) Continuation-in-part of application No. 10/654,199, filed on Sep. 2, 2003, now Pat. No. 7,715,836.

(60) Provisional application No. 60/408,157, filed on Sep. 3, 2002, provisional application No. 61/090,787, filed on Aug. 21, 2008.

(51) Int. Cl.
  *H04B 17/00* (2006.01)
  *H04B 1/40* (2006.01)
  *H04B 1/30* (2006.01)

(52) U.S. Cl.
  CPC .. *H04B 1/40* (2013.01); *H04B 1/30* (2013.01); *H04B 17/14* (2013.01); *H04B 17/20* (2013.01)

(58) Field of Classification Search
  CPC .................................................. H04B 17/0012
  USPC ........................... 455/423, 67.11, 15.1, 226.1
  See application file for complete search history.

(56) References Cited

U.S. PATENT DOCUMENTS

| | | | |
|---|---|---|---|
| 5,732,333 A | 3/1998 | Cox et al. | |
| 5,905,760 A | 5/1999 | Schnabl et al. | |
| 6,034,573 A | * 3/2000 | Alderton | 332/125 |
| 6,281,829 B1 | * 8/2001 | Amrany et al. | 341/155 |

(Continued)

OTHER PUBLICATIONS

Cavers, J.K., "New Methods for Adaption of Quadrature Modulators and Demodulators in Amplifier Linearization Circuits," *IEEE Transactions on Vehicular Technology*—46(3): 707-716, IEEE, United States (Aug. 1997).

(Continued)

*Primary Examiner* — Wen Huang
(74) *Attorney, Agent, or Firm* — Sterne, Kessler, Goldstein & Fox P.L.L.C.

(57) ABSTRACT

Methods and systems for calibrating a multi-mode, multi-standard transmitter and receiver are disclosed. Aspects of the method may include configuring calibration paths in a transceiver on a chip including a plurality of Tx and Rx paths. IP2 distortion may be calibrated for the Rx paths utilizing a phase locked loops in the chip and the configurable calibration paths. Local oscillator leakage, Rx path DC offset and RSSI, Tx and Rx I and Q mismatch, and Tx and Rx path filters may be calibrated utilizing the plurality of configurable calibration paths. Cutoff frequency of the filters in the Tx and Rx paths may be calibrated. Blocker signals may be mitigated by calibrating amplifier gains in the Rx paths. The calibration paths may include an envelope detector. Local oscillator leakage and I and Q mismatch may be mitigated utilizing pre-distortion generated by an on-chip digital signal processor in the Tx paths.

20 Claims, 8 Drawing Sheets

(56) References Cited

U.S. PATENT DOCUMENTS

| | | | |
|---|---|---|---|
| 6,311,048 B1* | 10/2001 | Loke | 455/245.1 |
| 6,397,042 B1 | 5/2002 | Prentice et al. | |
| 6,529,844 B1* | 3/2003 | Kapetanic et al. | 702/85 |
| 6,583,662 B1* | 6/2003 | Lim | 327/553 |
| 6,804,497 B2 | 10/2004 | Kerth et al. | |
| 7,061,994 B2 | 6/2006 | Li et al. | |
| 7,110,469 B2 | 9/2006 | Shi et al. | |
| 7,120,427 B1* | 10/2006 | Adams et al. | 455/418 |
| 7,130,589 B2 | 10/2006 | Lee et al. | |
| 7,212,587 B2 | 5/2007 | Khlat et al. | |
| 7,379,716 B2* | 5/2008 | Eisenstadt et al. | 455/126 |
| 7,715,836 B2 | 5/2010 | Vassiliou et al. | |
| 7,889,121 B2 | 2/2011 | Kanto | |
| 2002/0018531 A1 | 2/2002 | Ratto | |
| 2003/0087614 A1* | 5/2003 | Kramer | 455/112 |
| 2003/0176174 A1* | 9/2003 | Seppinen et al. | 455/226.1 |
| 2003/0223480 A1 | 12/2003 | Cafarella | |
| 2004/0038649 A1* | 2/2004 | Lin et al. | 455/130 |
| 2004/0137870 A1* | 7/2004 | Kivekas et al. | 455/326 |
| 2005/0107059 A1* | 5/2005 | Lehning et al. | 455/303 |
| 2010/0233971 A1 | 9/2010 | Vassiliou et al. | |

OTHER PUBLICATIONS

Come, B., et al., "Impact of front-end non-idealities on Bit Error Rate performances of WLAN-OFDM transceivers," *Proc. RAWCON 2000*: 91-94 (2000).

Gray, P.R., and Meyer, R.G., "Future Directions in Silicon ICs for Rf Personal Communications," *Proc. IEEE Custom Integrated Circuits Conf.*: 83-90 (May 1995).

Hajimiri, A., et al., "Design Issues in CMOS Differential LC Oscillators," *IEEE Journal of Solid-State Circuits*—35(5): 717-724, IEEE, United States (May 1999).

Khorramabadi, H., et al., "Baseband Filters for Is-95 CDMA Receiver Applications Featuring Digital Automatic Frequency Tuning," *Proc. IEEE Int. Solid-State Circuits Conf*—FA 10.6: 172-173 & 439, IEEE, United States (Feb. 1996).

Laber, C.A., et al., "A 20-MHz Sixth-Order BiCMOS Parasitic-Insensitive Continuous-Time Filter and Second-Order Equalizer Optimized for Disk-Drive Read Channels," *IEEE Journal of Solid-State Circuits*—28(4): 462-470, IEEE, United States (Apr. 1993).

Lee, T.H., et al., "5-GHz CMOS Wireless LANs," *IEEE Transactions on Microwave Theory and Techniques*—50(1): 268-280 (Jan. 2002).

Lin, L., et al., "A 1.4 GHz Differential Low-Noise CMOS Frequency Synthesizer using a Wideband PLL Architecture," *Proc. IEEE Int. Solid-State Circuits Conf.*,—TP 12.5: 204-205 (Feb. 2000).

Liu, T., et al., "5-GHz CMOS Radio Transceiver Front-End Chipset," *IEEE Journal of Solid-State Circuits*—35(1): IEEE, United States (Dec. 2000).

Magoon, R., et al., "A Single-Chip Quad-Band (850/900/1900 MHz) Direct Conversion GSM/GPRS RF Transceiver with Integrated VCOs and Fractional-N Synthesizer," *IEEE Journal of Solid-State Circuits*—37(12): 1710-1720 (Dec. 2002).

Razavi, B., "A 5.2 GHz Cmos Receiver with 62-dB Image Rejection," *IEEE Journal of Solid-State Circuits*—36(5): 810-815 (May 2001).

Rofougaran, A., et al. "A 1 GHz CMOS RF Front-End IC for a Direct-Conversion Wireless Receiver," *IEEE Journal of Solid-State Circuits*—31(7): 880-889 (Jul. 1996).

Rudell, J.C., et al., "A 1.9 GHz Wide-Band IF Double Conversion CMOS Receiver for Cordless Telephone Applications," *IEEE Journal of Solid-State Circuits*—32(12): 2071-2088 (Dec. 1997).

Rudell, J.C., et al., "Recent Developments in High Integration Multi-Standard.Cmos Transceivers for Personal Communication Systems," *Proc. Int. Symp. Low Power Elect. Design*: 149-154 (Aug. 1998).

Steyaert, M., et al., "A Single-Chip CMOS Transceiver for DCS-1800 Wireless Communications," *Proc. IEEE Int. Solid-State Circuits Conf*—TP 3.3: 3.3-1 to 3.3-10 (Feb. 1998).

Terrovitis, M.T., and Meyer, R.G., "Noise in Current-Communicating CMOS Mixers," *IEEE Journal of Solid-State Circuits*—34(6): 772-783 (Jun. 1999).

Vaucher, C.S., et al., "A Family of Low-Power Truly Modular Programmable Dividers in Standard 0.35-μm CMOS Technology," *IEEE Journal of Solid-State Circuits*—35(7): 1039-1045 (Jul. 2000).

Zagari, M., et al., "A 5-GHz CMOS Transceiver for IEEE 802.11a Wireless LAN Systems," *IEEE Journal of Solid-State Circuits*—37(12): 1688-1694 (Dec. 2002).

\* cited by examiner

METHOD AND SYSTEM FOR CALIBRATING A MULTI-MODE, MULTI-STANDARD TRANSMITTER AND RECEIVER

CROSS-REFERENCE TO RELATED APPLICATIONS/INCORPORATION BY REFERENCE

This application is a continuation-in-part of U.S. patent application Ser. No. 10/654,199 filed on Sep. 2, 2003, which is hereby incorporated herein by reference in its entirety.

This application makes reference to and claims priority to U.S. Provisional Application Ser. No. 61/090,787 filed on Aug. 21, 2008, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for calibrating a multi-mode, multi-standard transmitter and receiver.

BACKGROUND OF THE INVENTION

Mobile communications have changed the way people communicate and mobile phones have been transformed from a luxury item to an essential part of every day life. The use of mobile phones today is dictated by social situations, rather than hampered by location or technology. While voice connections fulfill the basic need to communicate, and mobile voice connections continue to filter even further into the fabric of every day life, various integrated mobile multimedia applications, utilizing the mobile Internet, may be the next step in the mobile communication revolution.

Third generation (3G) cellular networks offering various high speed access technologies and mobile telephones that have been specifically designed to utilize these technologies, fulfill demands for integrated multimedia applications supporting TV and audio applications utilizing advanced compression standards, high-resolution gaming applications, musical interfaces, and peripheral interface support. The processing requirements are being increased as chip designers take advantage of compression and higher bandwidths to transmit more information. 3G wireless applications support bit rates from 384 kilobits (Kbits)/second to 2 megabits (Mbits)/second, allowing chip designers to provide wireless systems with multimedia capabilities, superior quality, reduced interference, and a wider coverage area.

As mobile multimedia services grow in popularity and usage, factors such as power consumption, cost efficient optimization of network capacity and quality of service (QoS) will become even more essential to cellular operators than it is today. These factors may be achieved with careful network planning and operation, improvements in transmission methods, and advances in receiver techniques and chip integration solutions. To this end, carriers need technologies that will allow them to increase downlink throughput for the mobile multimedia applications support and, in turn, offer advanced QoS capabilities and speeds for consumers of mobile multimedia application services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for calibrating a multi-mode, multi-standard transmitter and receiver, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for calibrating a multi-mode, multi-standard transmitter and receiver. Exemplary aspects of the invention may comprise configuring a plurality of calibration paths in a transceiver on a chip comprising a plurality of transmitter (Tx) and receiver (Rx) paths. Second order intercept point (IP2) distortion may be calibrated for the plurality of the Rx paths utilizing a plurality of phase locked loops in the chip and the plurality of configurable calibration paths. Local oscillator leakage, Rx path DC offset and RSSI, Tx and Rx in-phase (I) and quadrature-phase (Q) mismatch, and Tx and Rx path filters may be calibrated utilizing the plurality of configurable calibration paths. Cutoff frequency of the filters in the Tx and Rx paths may be calibrated. Blocker signals may be mitigated by calibrating one or more amplifier gains in the plurality of Rx paths. The calibration paths may comprise an envelope detector. One or more of local oscillator leakage and I and Q mismatch may be mitigated utilizing pre-distortion generated by an on-chip digital signal processor in the plurality of Tx paths.

Figure 1:
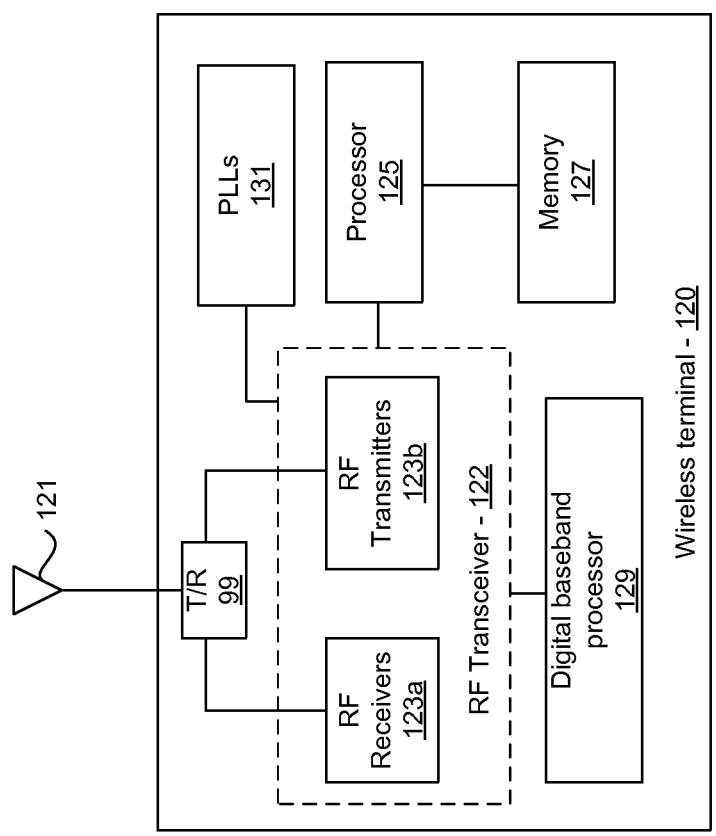
FIG. 1 is a block diagram of an exemplary mobile terminal that may enable calibration of a multi-mode, multi-standard transmitter and receiver, in accordance with an embodiment of the invention.

FIG. 1 is a block diagram of an exemplary mobile terminal that may enable calibration of a multi-mode, multi-standard transmitter and receiver, in accordance with an embodiment of the invention. Referring to FIG. 1, there is shown a wireless terminal 120 that may comprise an RF receiver 123a, an RF transmitter 123b, a digital baseband processor 129, PLLs 131, a processor 125, and a memory 127. The wireless terminal 120 may enable communication via a cellular network (GSM/EDGE, WCDMA and/or LTE), a wireless local area network (WLAN) and a Bluetooth network, and may be enabled to receive and process GPS signals. In an embodiment of the invention, the RF receiver 123a and the RF transmitter 123b may be integrated into a single RF transceiver 122, for example. The RF receiver 123a and the RF transmitter 123b may be integrated into a single chip that comprises a cellular radio (GSM/EDGE, WCDMA and/or LTE), WLAN radio and a Bluetooth radio, for example. The single chip comprising cellular, WLAN and Bluetooth radios may be implemented utilizing a single CMOS substrate, for example.

One or more transmit and receive antennas, shown schematically by the antenna 121, may be communicatively coupled to the RF receiver 123a and the RF transmitter 123b. In this regard, the antenna 121 may enable WLAN and Bluetooth transmission and/or reception, for example. A switch or other device having switching capabilities may be coupled between the RF receiver 123a and RF transmitter 123b, and may be utilized to switch the antenna 121 between transmit and receive functions in instances where a single antenna may be used to transmit and receive. The wireless terminal 120 may be operated in a system, such as a Wireless Local Area Network (WLAN), a cellular network, such as Long Term evolution (LTE), W-CDMA, and/or GSM, a digital video broadcast network, and/or a Wireless Personal Area Network (WPAN) such as a Bluetooth network, for example. In this regard, the wireless terminal 120 may support a plurality of wireless communication protocols, including the IEEE 802.11g/n standard specifications for WLAN networks.

The RF receiver 123a may comprise suitable logic, circuitry, interfaces, and/or code that may enable processing of received RF signals. The RF receiver 123a may enable receiving RF signals in a plurality of frequency bands in accordance with the wireless communications protocols that may be supported by the wireless terminal 120. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the wireless terminal 120 may comprise more than one RF receiver 123a, wherein each of the RF receivers 123a may be a single-band or a multi-band receiver. The RF receiver 123a may be implemented on a chip. In an embodiment of the invention, the RF receiver 123a may be integrated with the RF transmitter 123b on a chip to comprise an RF transceiver, for example. In another embodiment of the invention, the RF receiver 123a may be integrated on a chip with more than one component in the wireless terminal 120.

The RF receiver 123a may be operable to quadrature down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, interfaces, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network. In an embodiment of the invention, the digital baseband processor 129 may be integrated on a chip with more than one component in the wireless terminal 120.

The RF transmitter 123b may comprise suitable logic, circuitry, interfaces, and/or code that may enable processing of RF signals for transmission. The RF transmitter 123b may enable transmission of RF signals in a plurality of frequency bands. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the wireless terminal 120 may comprise more than one RF transmitter 123b, wherein each of the RF transmitter 123b may be a single-band or a multi-band transmitter. The RF transmitter 123b may be implemented on a chip. In an embodiment of the invention, the RF transmitter 123b may be integrated with the RF receiver 123a on a chip to comprise an RF transceiver, for example. In another embodiment of the invention, the RF transmitter 123b may be integrated on a chip with more than one component in the wireless terminal 120.

The RF transmitter 123b may be operable to quadrature up-convert the baseband frequency signal comprising I/Q components to an RF signal. The RF transmitter 123b may perform direct up-conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, interfaces, and/or code that may enable control and/or data processing operations for the wireless terminal 120. The processor 125 may be operable to control at least a portion of the RF receiver 123a, the RF transmitter 123b, the digital baseband processor 129, and/or the memory 127. In this regard, the processor 125 may be operable to generate at least one signal for controlling operations within the wireless terminal 120. The processor 125 may also enable executing of applications that may be utilized by the wireless terminal 120. For example, the processor 125 may generate at least one control signal and/or may execute applications that may enable current and proposed WLAN communications and/or Bluetooth communications in the wireless terminal 120.

The memory 127 may comprise suitable logic, circuitry, interfaces, and/or code that may enable storage of data and/or other information utilized by the wireless terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the wireless terminal 120. For example, the memory 127 may comprise information that may be utilized to configure the RF receiver 123a for receiving WLAN and/or Bluetooth signals in the appropriate frequency band.

The RF receiver 123a may comprise a low noise amplifier (LNA) that may be configured to operate in single-ended mode or a differential mode. Similarly an on-chip balun may also be configurable for single-ended or differential mode. In this manner, the balun may be integrated on-chip as a load to the LNA, thereby improving the noise figure for the RF receiver 123a.

Various aspects of the invention may be operable to support a plurality of wireless standards in, for example, a single integrated transceiver. In this regard, each of a transmit chain and a receive chain may be configured to support Long Term evolution (LTE), W-CDMA, and GSM wireless standards. LTE technology capabilities may comprise orthogonal frequency division multiplexing (OFDM), multiple antenna (MIMO), bandwidth scalability, existing (I-XI) and new (XII-XIV) bands, FDD and TDD, for example. OFDM capability may provide robustness against multipath issues, ease of scheduling of time/frequency resources, and increased spectral efficiency.

MIMO technology may provide enhanced data rate and performance, and may comprise 1 Tx and 2 Rx antennas, for example. Bandwidth scalability may enable efficient operation in differently-size allocated spectrum bands which may comprise 1.4, 3, 5, 10, 15 and 20 MHz, for example.

Single carrier FDMA (SC-FDMA) may enable frequency domain generation (DFT-Spread OFDM) and scalable bandwidth and flexible scheduling. In an embodiment of the invention, SC-FDMA may utilize quantized phase shift keying (QPSK) and N-bit quantized amplitude modulation (N-QAM), for example.

Configurable components/portions of the RF receivers 123a may comprise LNA(s), mixer(s), RF filter(s), PLL(s), VCO(s), ADC(s), and baseband filter(s). The receive chain may be configured to optimize power consumption for a given standards (LTE, W-CDMA, GSM) and conditions (e.g. interference, signal strength).

Configurable components/portions of the RF transmitters 123b may comprise PA(s), mixer(s), RF filter(s), PLL(s), VCO(s), DAC(s), and baseband filter(s). The transmit chain may be configured to optimize power consumption for a given standard (LTE, W-CDMA, GSM) and condition (e.g. interference, signal strength). In an exemplary embodiment of the invention, the transmit chain may be configured to select between IQ modulation or polar modulation. The selection between IQ modulation or polar modulation may provide optimized signal strength or power usage, for example.

Since each supported communication standard may comprise different filtering requirements, the baseband filter or filters may be configured to enable communication by any of the supported standards. In various exemplary embodiments of the invention, for GSM a Butterworth filter may be utilized, for W-CDMA, a Chebyschev filter of 0.3 dB ripple may be utilized, and in LTE, a Chebyschev filter with 1 dB ripple may be utilized. Furthermore, the filter bandwidth requirements may be different. For GSM the bandwidth may be up to 300 kHz, in wideband CDMA up to 2 MHz, and in LTE the bandwidth may vary from 0.7 MHz to 10 MHz. Thus, there may be a plurality of different filter types and a plurality of different filter cutoff frequencies in the filter. In an exemplary embodiment of the invention, there may be three different filter types and eight different filter cutoff frequencies in the filter.

In accordance with various embodiments of the invention, the RF receivers 123a may be calibrated for DC offset, gain, IQ mismatch, and/or second order intercept point (IP2), for example. Similarly, the RF transmitters 123b may be calibrated for carrier leakage, IQ mismatch, and baseband filter cutoff, for example. The calibrations may be performed at the startup of the wireless terminal 120, or may be performed dynamically during operation as needed.

A receiver direct current (Rx DC) offset may affect demodulation requirements and may reduce the dynamic range of various Rx processing circuits. In an embodiment of the invention, the DC offset may be measured at power-up for each channel and subtracted in the analog domain. The, RX IQ mismatch may also create an error floor regardless of signal strength, and may be mitigated using an on-chip Tx-Rx loopback. In this manner, the RX IQ mismatch may be measured and post-distorted digitally to compensate. This calibration may be performed on a regular basis as well as at system start up.

Figure 2:
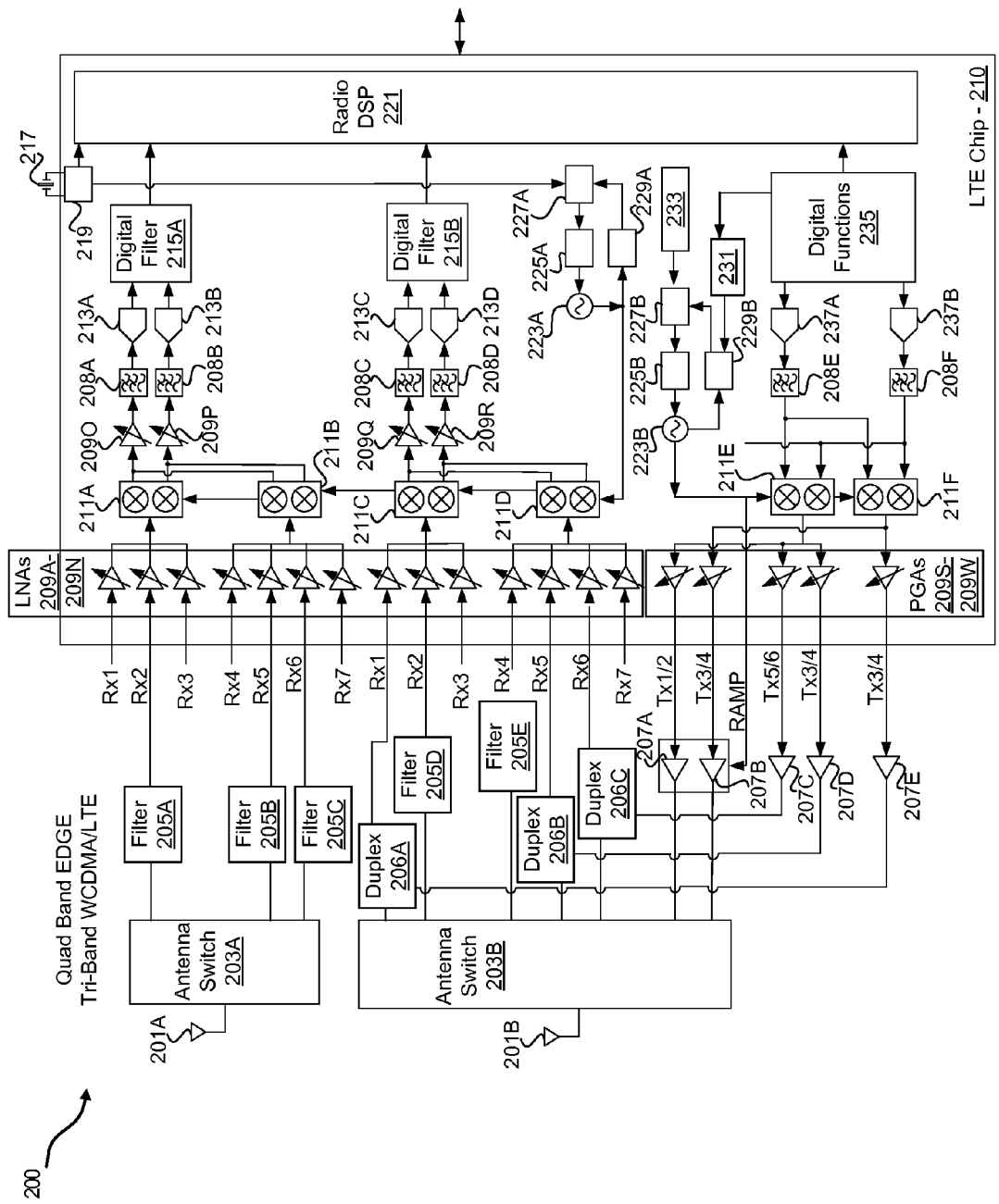
FIG. 2 is a block diagram illustrating an exemplary long term evolution (LTE) radio that may enable calibrating a multi-mode, multi-standard transmitter and receiver, in accordance with an embodiment of the invention.

FIG. 2 is a block diagram illustrating an exemplary long term evolution (LTE) radio that may enable calibrating a multi-mode, multi-standard transmitter and receiver, in accordance with an embodiment of the invention. Referring to FIG. 2, there is shown an LTE radio platform 200 comprising an LTE chip 210, antennas 201A and 201B, antenna switches 203A and 203B, filters 205A-205E, duplexers 206A-206C, amplifiers 207A-207E, and a crystal oscillator 217.

The LTE chip 210 may comprise low noise amplifiers (LNAs) 209A-209R, RF PGAs 209S-209W, mixers 211A-211F, filters 208A-208F, analog to digital converters (ADCs) 213A-213D, digital filters 215A and 215B, a crystal oscillator control block 219, a radio DSP 221, voltage controlled oscillators (VCOs) 223A and 223B, low pass filters 225A and 225B, phase-frequency detector (PFD)/charge pump (CP) blocks 227A and 227B, multi-modulus dividers (MMDs) 229A and 229B, a phase modulator 231, a reference PLL 233, a digital functions block 235, and digital to analog converters (DACs) 237A and 237B.

The antennas 201A and 201B may comprise electromagnetic signal transmit and/or receive capability, and may be enabled to transmit or receive RF signals that may be processed by the LTE chip 210. The antenna switches 203A and 203B may comprise suitable circuitry, interfaces, logic, and/or code that may enable the selection of a path to be transmitted from the LTE chip 210 and/or to communicate a received signal to the LTE chip 210.

The filters 205A-205E and the baseband filters 208A-208F may comprise suitable circuitry, logic, and/or code that may enable filtering a received signal. In this manner, a signal of a desired frequency may be communicated through the filters 205A-205E and the baseband filters 208A-208F, while signals outside the desired frequency range may be attenuated. The baseband filters 208A-208F may be configurable, and may comprise one or more of a plurality of stages that may be switched on and off. The baseband filters 208A-208F may also be frequency-configurable, thus enabling multiband, multi-standard operation.

The duplexers 206A-206C may comprise suitable circuitry, logic, and/or code that may enable simultaneous operation of Tx and Rx through a single path. The duplexers 206A-206C may filter a Tx signal to the antenna and filter Rx signals from the antenna, and may also provide isolation between a chip comprising the Tx and Rx ports in a printed circuit board, for example.

The amplifiers 207A-207E may comprise suitable circuitry, logic, and/or code that may enable the amplification of a transmitted signal to a desired amplitude suitable for transmission via the antenna 201B. The low noise amplifiers (LNAs) 209A-209R may comprise suitable circuitry, logic, and/or code that may enable the amplification of a received signal, and may be configured to a desired gain level depending on the requirements of the standard being utilized for RF communication and desired noise figure. The LNAs 209A-209N may each comprise a different Rx path, such as high band (HB) and low band (LB) signals, or different bands, such as Bands I-XV, for example. The RF PGAs 209S-209W may comprise suitable circuitry, logic, and/or code that may enable the amplification of a transmit signal and may provide an interface to components external to the LTE chip 210.

The mixers 211A-211F may comprise suitable circuitry, logic, and/or code that may enable up-conversion of a baseband or intermediate frequency signal to an RF frequency and/or down-conversion from an RF frequency to an intermediate or baseband frequency. The mixers 211A-211F may receive as inputs a signal to be converted and a local oscillator signal that may enable frequency conversion via the generation of sum and difference signals with the undesired signal subsequently being filtered out, leaving a signal at a desired frequency.

The ADCs 213A-213D may comprise suitable circuitry, logic, and/or code that may be enabled to receive an analog signal and generate a digital output signal. The DACs 237A and 237B may comprise suitable circuitry, logic, and/or code that may be enabled to receive a digital signal and generate an analog output signal.

The digital filters 215A and 215B may comprise suitable circuitry, interfaces, logic, and/or code that may enable channel match filtering, de-rotation, and/or digital filtering of a received signal in the digital domain. In this manner, undesired signals generated by the ADCs 213A and 213B may be removed before communicating a signal to the radio DSP 221.

The crystal oscillator 217 may comprise a crystal that oscillates at a characteristic frequency determined by the material in the crystal. The crystal oscillator control block 219 may comprise suitable circuitry, logic, and/or code that may control the crystal oscillator 217. The crystal oscillator control block 219 may receive a signal at a characteristic frequency from the crystal oscillator 217, amplify the signal, and communicate the amplified feedback signal back to the crystal oscillator 217. In this manner, a stable clock signal may be generated at the characteristic frequency of the crystal oscillator 217.

The radio DSP 221 may comprise suitable circuitry, logic, interfaces, and/or code that may enable the processing of digital signals via arbitrary functionality defined by user preferences and/or programming. The digital signals may comprise baseband signals, for example, and may represent information to be transmitted via the antenna 201B and/or received by the antenna 201A.

The VCOs 223A and 223B may comprise suitable circuitry, logic, interfaces, and/or code that may be enabled to generate an output signal at a desired frequency as defined by an input voltage. The frequency of oscillation may be configured by varying the input voltage.

The LPFs 225A and 225B may comprise suitable circuitry, logic, and/or code that may be enabled to filter out higher frequency signals while allowing lower frequency signals to pass. The LPFs 225A and 225B may comprise feedback loops in PLLs to enable error correction and frequency lock of the PLLs. The input signals to the PLLs may comprise the crystal oscillator 217 and the reference PLL 233, for example.

The PFD/CP blocks 227A and 227B may comprise suitable circuitry, logic, and/or code that may be enabled to generate an error signal from a reference signal and a feedback signal received from a frequency divider, such as the MMDs 229A and 229B. The error signal may be communicated to the LPFs 225A and 225B before being communicated to the VCOs 223A and 223B to adjust the frequency generated.

The MMDs 229A and 229B may comprise suitable circuitry, logic, and/or code that may be enabled to divide the frequency of a signal received from the VCOs 223A or 223B. The divided frequency signal may be communicated to the PFD/CP blocks 227A and 227B to generate an error signal for frequency locking of the VCOs 223A and 223B.

The phase modulator 231 may comprise suitable circuitry, logic, and/or code that may be enabled to modulate the phase of a signal generated from a signal received from the digital functions block 235. In this manner, the phase of the LO signal generated by the VCO 223B may be configurable.

The reference PLL 233 may comprise suitable circuitry, logic, and/or code that be enabled to generate a signal at a desired frequency. The output signal may be communicated to the PFD/CP block 227B to provide a reference LO signal for configuring the VCO 223B.

The digital functions block 235 may comprise suitable circuitry, logic, interfaces, and/or code that may perform specific digital functions on digital baseband signals before communicating them to the DACs 237A and 237B or the phase modulator 231. The digital functions may comprise, channel match filtering, cordic, and calibrations, for example.

In operation, the LTE radio platform 200 may comprise support for bands I through XIV and also additional standards such as HSPA+, HSPA, UMTS, and GSM/EDGE, for example. Additionally, a WCDMA/LTE system may support up to three bands using dedicated WCDMA/LTE Tx outputs or up to five bands, with multi-mode power amplifier (PA) support, for example. Similarly, the LTE radio platform 200 may support quad-band GSM/EDGE transmit and receive, LTE/WCDMA diversity with 2Rx/1Tx path, as well as FDD and TDD operation. In the Tx, bands V, VI, and VIII, may be supported, for example, with multi-mode outputs (GSM/EDGE/WCDMA on a single output) and also separate outputs. On the Rx side, new bands such as VII, XI, XIII, and XIV, for example, may also be supported with Rx diversity utilizing a single Rx VCO. Additionally, the Rx may enable linearity on demand, Tx leakage mitigation, and no Tx or Rx interstage filters or external LNAs. Similarly, reduced supply voltage may be enabled (2.3-2.5 V, for example) to support improved battery technology.

In an embodiment of the invention, the Rx portion of the LTE radio platform 200 may be calibrated for DC offset, gain, IQ mismatch, and/or second order intercept point (IP2), for example. Similarly, the Tx portion of the LTE radio platform 200 may be calibrated for carrier leakage, IQ mismatch, and baseband filter cutoff, for example. The calibrations may be performed at the startup of the LTE radio platform 200, or may be performed dynamically during operation as needed.

The Rx DC offset may affect demodulation requirements and may reduce the dynamic range of Rx circuits. In an embodiment of the invention, the Rx DC offset may be measured at power-up for each channel and subtracted in the analog domain. Similarly, RX IQ mismatch may create an error floor regardless of signal strength, and may be mitigated using an on-chip Tx-Rx loopback. In this manner, the RX IQ mismatch may be measured and post-distorted digitally to compensate for the mismatch. This calibration may be performed periodically, aperiodically, dynamically, and/or at system start up.

Receiver second order intercept (IP2), or AM demodulation, due to second-order distortion of Tx leakage may degrade Rx noise figure. In an embodiment of the invention, an on-chip Tx-Rx loopback may be utilized to measure Rx IP2 and calibrate Rx mixers 211A-211D to compensate. Transmitter carrier leakage may affect Tx gain control and error vector magnitude (EVM). In an embodiment of the invention, a Tx-Rx loopback path and on-chip RF detector in the Tx path may be utilized to generate a pre-distortion signal in the digital domain to compensate. Baseband filter cutoff differences between I and Q paths may affect the orthogonality of signals and may create a frequency dependent error floor regardless of the power level of the input signal. It may be desirable to enable filter cutoff adjustment to less than 1%.

Figure 3A:
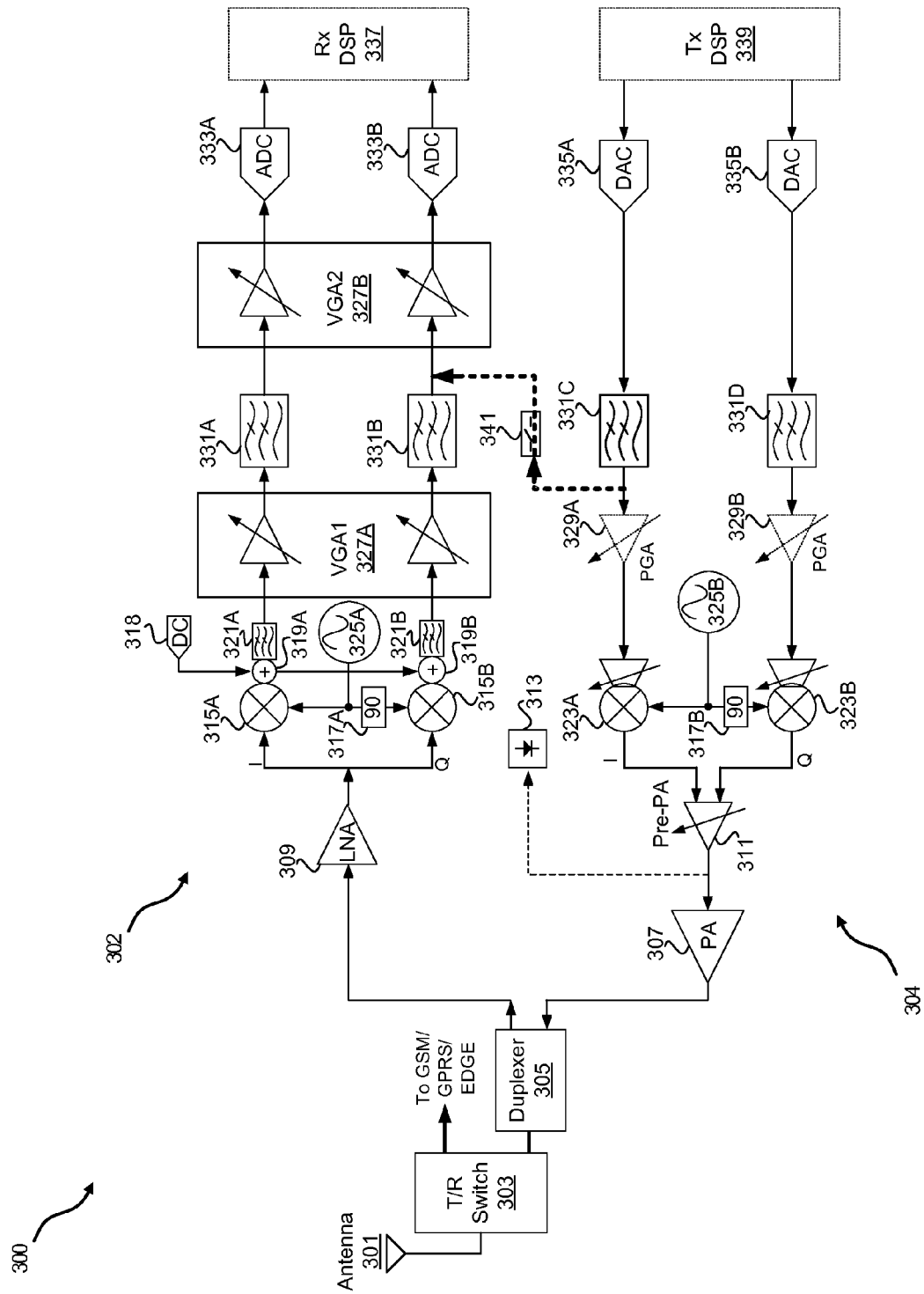
FIG. 3A is a block diagram illustrating an exemplary Tx filter calibration, in accordance with an embodiment of the invention.

FIG. 3A is a block diagram illustrating an exemplary Tx filter calibration, in accordance with an embodiment of the invention. Referring to FIG. 3A, there is shown a Tx filter calibration 300 comprising an antenna 301, a T/R switch 303, a duplexer 305, a power amplifier (PA) 307, a low-noise amplifier (LNA) 309, a pre-PA 311, an envelope detector 313, mixers 315A and 315B, 90 degree phase blocks 317A and 317B, the DC offset block 318, and adders 319A and 319B. The Tx filter calibration 300 also comprises low-pass filters (LPFs) 321A and 321B, mixer/PGAs 323A and 323B, LO generators 325A and 325B, VGAs 327A and 327B, PGAs 329A and 329B, LPFs 331A-331D, ADCs 333A and 333B, DACs 335A and 335B, Rx DSP 337, and Tx DSP 339.

The Tx1 path 302 may comprise one of a plurality of transmit paths in the mobile terminal 120, as shown in the LTE radio platform 200 described with respect to FIG. 2. Similarly, the Rx1 path 304 path may comprise one of a plurality of Rx paths in the mobile terminal 120. Each path may comprise an in-phase and a quadrature path, as indicated by the "I" and "Q" notations in FIG. 3.

The antenna 301 may be substantially similar to the antennas 201A and 201B, and may comprise a single antenna or a plurality of antennas that may be operable to transmit and receive RF signals. The T/R switch 303 may enable switching of received signals or signals to be transmitted by the antenna 301 to and/or from various sections of the LTE radio platform 200. For example, the T/R switch 303 may receive an RF signal via the antenna 301 and may couple the received signal to the duplexer 305 and/or to GSM/GPRS/EDGE circuitry, not shown.

The duplexer 305 may comprise suitable circuitry, logic, and/or code that may be operable to switch transmit and receive signals via the same signal path to allow full and/or half duplex mode. The duplexer 305 may be communicatively coupled to the LNA 309 and the PA 307.

The PA 307 may comprise suitable circuitry, logic, and/or code that may be operable to amplify a signal received from the pre-PA 311. The output of the PA 307 may be communicatively coupled to the duplexer 305. The LNA 309 may comprise suitable circuitry, logic, and/or code that may be operable to amplify a received signal from the duplexer 305 and generate an output that may be communicated to the mixers 315A and 315B.

The pre-PA 311 may comprise an amplifier that may be operable to receive a signal from the mixers 323A and 323B and generate an amplified output signal that may be communicated to the PA 307. The gain of the pre-PA 311 may be configurable to obtain an RF signal at a desired magnitude for transmission by the antenna 301.

The envelope detector 313 may comprise suitable circuitry, logic, and/or code that may be operable to sense the magnitude of an RF signal generated by the Pre-PA 311, and may comprise a diode, for example. The envelope detector 313 may be utilized to calibrate the various components in the Tx path.

The mixers 315A and 315B may comprise suitable circuitry, logic, and/or code that may be operable to down-convert a received RF signal to an intermediate frequency (IF) or to baseband, for example. The mixers 315A and 315B may receive as inputs the output of the LNA 309, and the outputs of the mixers 315A and 315B may be communicatively coupled to the adders 319A and 319B. The mixers 315A and 315B may also receive as inputs an LO from the LO generator 325A and may thus generate I and Q signals respectively.

The 90 degree phase blocks 317A and 317B may comprise suitable circuitry, logic, and/or code that may be operable to generate a 90 degree phase delay in a received signal. Accordingly, the Q signal generated by the mixer 315B may utilize a 90 degree phase shifted LO signal via the 90 degree phase block 317A.

The adders 319A and 319B may comprise suitable circuitry, logic, and/or code that may be operable to add a plurality of input signals. The adders 319A and 319B may receive as inputs the output signals generated by the mixers 315A and 315B, respectively, as well as a DC signal from the DC offset block 318. In this manner, a DC offset may be added to the I and Q signals generated by the mixers 315A and 315B and utilized to mitigate the DC offset between I and Q branches of an Rx path.

The VGA1 327A and VGA2 327B may be substantially similar to the LNAs 209A-209O described with respect to FIG. 2. The PGAs 329A-329B, the LPFs 331A-331D, the ADCs 333A-333B, and the DACs 335A-335B may be substantially similar to the PGAs 209P-209S, the LPFs 208A-208F, the ADCs 213A-213B, and the DACs 237A-237B, also described with respect to FIG. 2.

The Rx DSP 337 and the Tx DSP 339 may comprise suitable circuitry, logic, interfaces, and/or code that may be operable to process digital signals via arbitrary functionality defined by user preferences and/or programming. The digital signals may comprise baseband signals, for example, and may represent information to be transmitted via the antenna 301 and/or received by the antenna 301.

The switch 341 may comprise suitable circuitry, logic, interfaces, and/or code that may enable the testing of various components in the Rx path 302 and/or the Tx path 304 by switching the signal generated by the LPF 331C to the input of the VGA2 327B. The invention is not limited to a single switch between the I path of the Tx path 304 and the Q path of the Tx path 302. Accordingly, the switch 341 may comprise a plurality of switches enabling the switching of any Rx path to any Tx path. In this manner, a plurality of paths and individual components may be calibrated.

In operation, the switch 341 may be closed and this may result in the output of the LPF 331C being coupled to the input of the VGA2 327B. A calibration signal may be generated by the Tx DSP 339 and communicated to the DAC 335A, the latter of which may convert the calibration signal to an analog signal that may be low pass filtered by the LPF 331C. The filtered signal may then be communicated to the VGA2 327B for amplification prior to being communicated to the ADC 333B. The ADC 333B may be operable to convert the signal to a digital signal for processing by the Rx DSP 337.

In this manner, the Rx DSP 337 may process the received signals to determine the response of the LPF 331C. This may be continued for each I and Q path in the plurality of Tx paths shown in FIG. 2. The cutoff frequency of the Tx filters may be determined and adjusted as desired. In an embodiment of the invention, the passband of the LPFs 331C-331D may be measured and pre-distortions in group delay may be adjusted by the Tx DSP 339 to result in a gain in the overall passband of the Tx path.

Figure 3B:
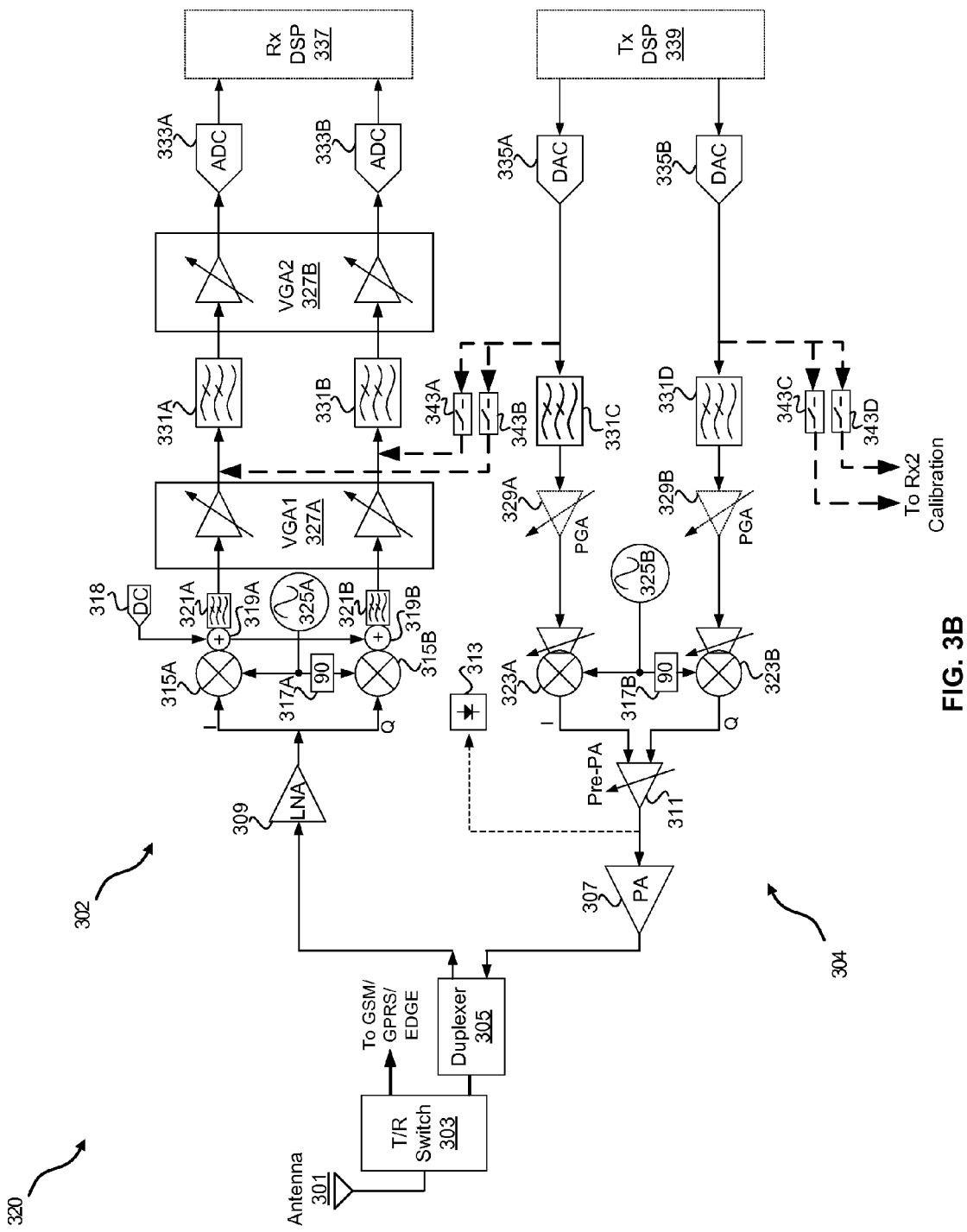
FIG. 3B is a block diagram illustrating an exemplary Rx filter calibration, in accordance with an embodiment of the invention.

FIG. 3B is a block diagram illustrating an exemplary Rx filter calibration, in accordance with an embodiment of the invention. Referring to FIG. 3B, there is shown an Rx filter calibration 320 comprising the antenna 301, the T/R switch 303, the duplexer 305, the power amplifier (PA) 307, the low-noise amplifier (LNA) 309, the pre-PA 311, the envelope detector 313, the mixers 315A and 315B, the 90 degree phase blocks 317A and 317B, the DC offset block 318, and the adders 319A and 319B. The Rx filter calibration 320 also comprises low-pass filters (LPFs) 321A and 321B, the mixer/PGAs 323A and 323B, the LO generators 325A and 325B, the VGAs 327A and 327B, the PGAs 329A and 329B, the LPFs 331A-331D, the ADCs 333A and 333B, the DACs 335A and 335B, the Rx DSP 337, and the Tx DSP 339.

There is also shown switches 343A-343D, which may be substantially similar to the switch 341 described with the respect to FIG. 3A, and may enable the calibration of the Rx path 302 filters, such as the LPFs 331A and 331B. The switches 343C and 343D may enable the calibration of Rx filters in other RX paths, not shown in FIG. 3B, but shown in FIG. 2.

In operation, a calibration signal may be generated by the Tx DSP 339 which may be converted to an analog signal by the DACs 335A and 335B. The switches 343A-343D may enable the switching of the analog signals to appropriate Rx paths, such as the I and Q paths of the Rx path 302, for example. In this manner, the cutoff frequency of the LPFs 331A and 331B may be measured and adjusted as desired. In an embodiment of the invention, the passband of the LPFs 331A and 331B may be measured and pre-distortions in group delay may be adjusted by the Tx DSP 339 to result in a gain in the overall passband of the Rx path.

In another embodiment of the invention, the feedback path provided by the switches 343A-343D may enable the measurement of gain mismatch in the I and Q paths of the Rx path 302 as well as other Rx paths. The gain levels of the VGA2 327B may then be adjusted and post-distortion by the Rx DSP 337 may be utilized to fine tune the gain mismatch.

Figure 3C:
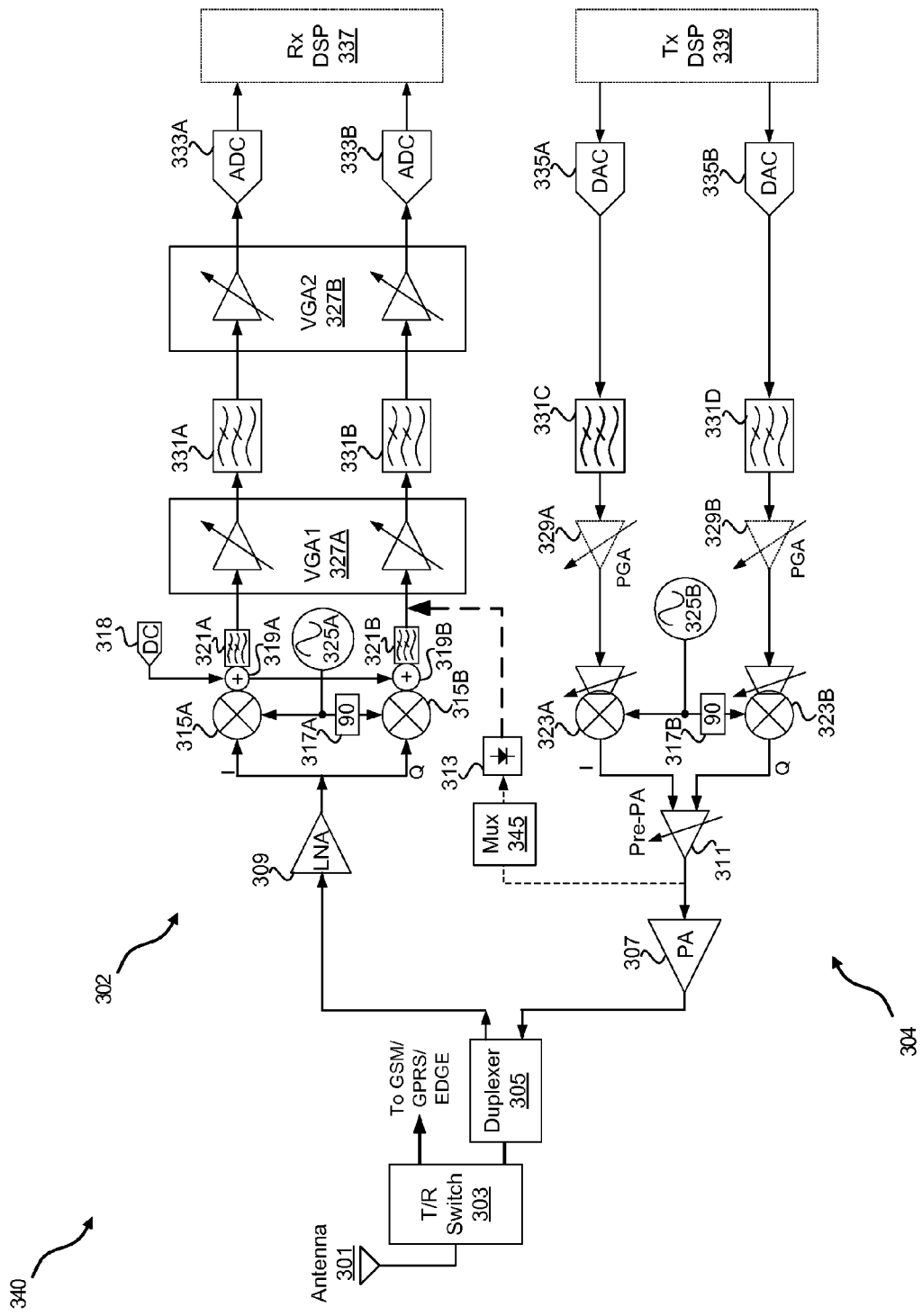
FIG. 3C is a block diagram illustrating an exemplary Tx IQ mismatch and LO leakage calibration, in accordance with an embodiment of the invention.

FIG. 3C is a block diagram illustrating an exemplary Tx IQ mismatch and LO leakage calibration, in accordance with an embodiment of the invention. Referring to FIG. 3C, there is shown a Tx IQ mismatch and LO leakage calibration 340 comprising the antenna 301, the T/R switch 303, the duplexer 305, the power amplifier (PA) 307, the low-noise amplifier (LNA) 309, the pre-PA 311, the envelope detector 313, the mixers 315A and 315B, the 90 degree phase blocks 317A and 317B, the DC offset block 318, and the adders 319A and 319B. The Rx filter calibration 320 also comprises low-pass filters (LPFs) 321A and 321B, the mixer/PGAs 323A and 323B, the LO generators 325A and 325B, the VGAs 327A and 327B, the PGAs 329A and 329B, the LPFs 331A-331D, the ADCs 333A and 333B, the DACs 335A and 335B, the Rx DSP 337, and the Tx DSP 339.

There is also shown a multiplexer (MUX) 345 which may comprise suitable circuitry, logic, interfaces, and/or code that may enable the coupling of one or more of a plurality of signals to the envelope detector 313. The plurality of signals may be received from the I and Q paths of a plurality of Tx paths, such as the Tx path 304 and others shown in FIG. 2.

In operation, a calibration signal may be generated by the Tx DSP 339 and communicated by a Tx I path, such as the one defined by the DAC 335A, the LPF 331C, the PGA 329A, the mixer/PGA 323A and the pre-PA 311, to the MUX 345. The DAC 335A may be operable to convert the calibration signal to an analog signal that may be low pass filtered by the LPF 331C, and then amplified by the PGA 329A. The filtered and amplified signal may then be amplified and upconverted by the mixer/PGA 323A utilizing an LO signal generated by the LO generator 325B. The upconverted signal may then be amplified by the pre-PA 311 and communicated to the MUX 345 which may communicate the received signal to the envelope detector 313, which may generate a signal that is proportional to the magnitude of the signal generated by the Tx path 304. The signal generated by the envelope detector 313 may be communicated to the VGA1 327A for amplification prior to being communicated to the LPF 331B, which may low pass filter the signal before further amplification by the VGA2 327B. The resulting amplified and filtered signal may be communicated to the ADC 333B, which may convert the signal to a digital signal for processing by the Rx DSP 337.

The Rx DSP 337 may measure Tx LO leakage and IQ mismatch by comparing the received signals with expected signals. The resulting calibration may be utilized to adjust and/or reduce the effects of leakage and mismatch utilizing pre-distortion in the Tx DSP 339. For example, if I and Q signals are of different magnitude, gains may be adjusted in the Tx path, and if Tx LO leakage is measured, an opposite polarity DC offset may be added in the Tx path to remove or reduce the leakage.

Figure 3D:
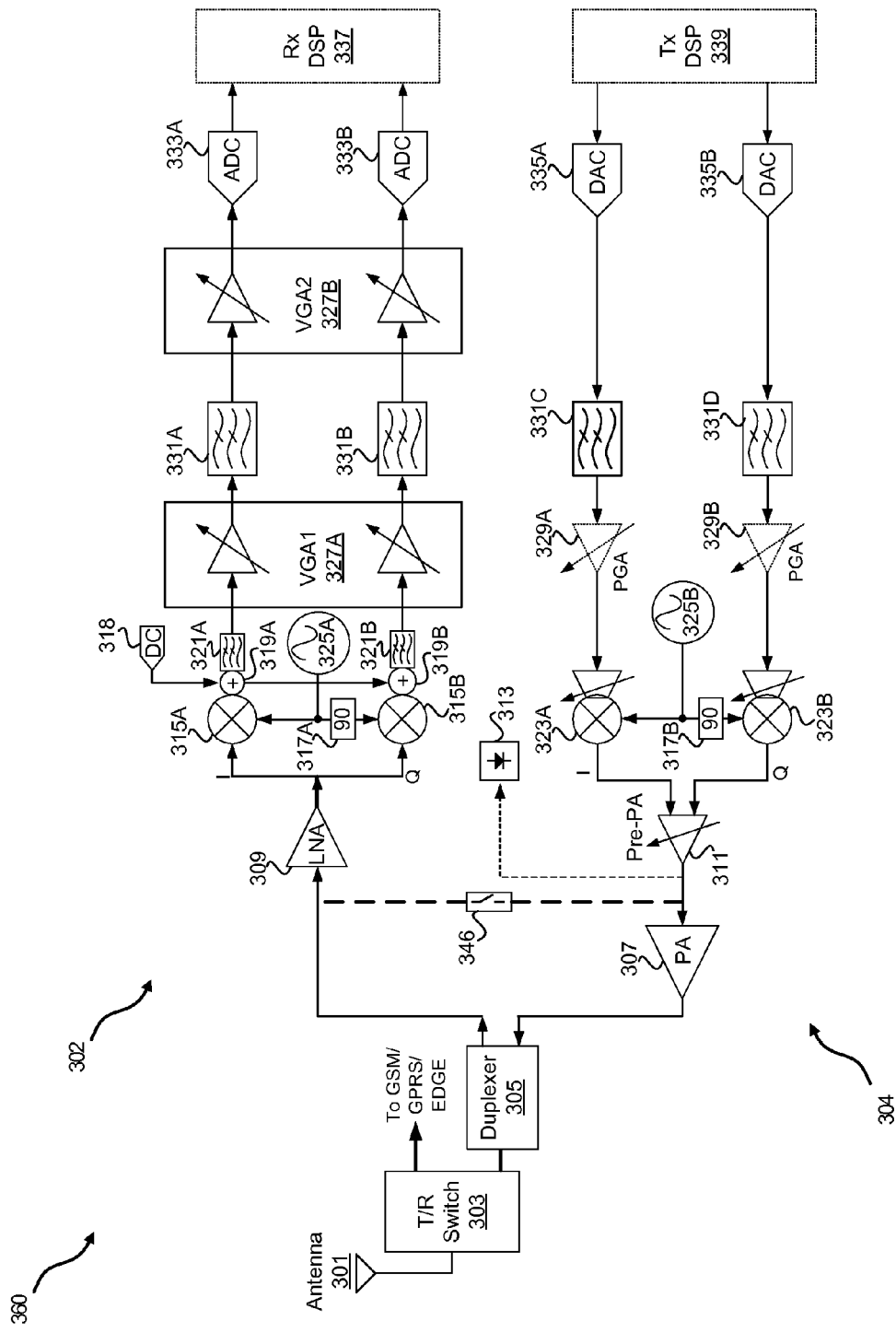
FIG. 3D is a block diagram illustrating an exemplary Rx IQ mismatch and IP2 calibration, in accordance with an embodiment of the invention.

FIG. 3D is a block diagram illustrating an exemplary Rx IQ mismatch and IP2 calibration, in accordance with an embodiment of the invention. Referring to FIG. 3D, there is shown an IQ mismatch and IP2 calibration 360 comprising the antenna 301, the T/R switch 303, the duplexer 305, the power amplifier (PA) 307, the low-noise amplifier (LNA) 309, the pre-PA 311, the envelope detector 313, the mixers 315A and 315B, the 90 degree phase blocks 317A and 317B, the DC offset block 318, and the adders 319A and 319B. The Rx filter calibration 320 also comprises the low-pass filters (LPFs) 321A and 321B, the mixer/PGAs 323A and 323B, the LO generators 325A and 325B, the VGAs 327A and 327B, the PGAs 329A and 329B, the LPFs 331A-331D, the ADCs 333A and 333B, the DACs 335A and 335B, the Rx DSP 337, and the Tx DSP 339.

There is also shown a switch 346, which may be substantially similar to the switch 341 described with respect to FIG. 3A, and may be enabled to couple Tx and Rx paths, such as the Tx path 304 to the Rx path 302. In this manner, the IQ mismatch and IP2 may be measured for each Rx path.

In operation, the switch 346 may be closed coupling the Tx path 304 to the Rx path 302. A calibration signal may be generated by the Tx DSP 339 and communicated to the DACs 335A and 335B which may convert the received signals to analog signals that may be low pass filtered by the LPFs 331C and 331D. The filtered signals may then be amplified by the PGAs 329A and 329B before being amplified and upconverted by the mixer/PGAs 323A and 323B. I and Q signals may be generated by the mixer/PGAs 323A and 323B, utilizing an LO signal generated by the LO generator 325B, in conjunction with the 90 degree phase block 317B. The I and Q signals generated by the mixer/PGAs 323A and 323B, respectively, may then be amplified by the pre-PA 311, generating a single IQ signal. The switch 346 may communicate the IQ signal to the LNA 309, the latter of which may be operable to amplify the signal before communicating an output signal to the mixers 315A and 315B, which may down-convert the signal into I and Q signals utilizing an LO signal from the LO generator 325A and the 90 degree phase block 317A.

The adders 319A and 319B may be utilized to add a DC offset to the down-converted I and Q signals, respectively, with the DC level generated by the DC offset block 318. The I and Q signals may be low pass filtered by the LPFs 321A and 321B, amplified by the VGA1 327A, low pass filtered by the LPFs 331A and 331b, and amplified by the VGA2 327B. The amplified and filtered I and Q signals may then be converted to digital signals by the ADCs 333A and 333B and communicated to the Rx DSP 337, which may measure the I and Q mismatch, and adjust digitally using post-distortion in the Rx DSP 337. Similarly, the Rx IP2 may be measured and adjusted via the Rx mixers, such as the mixers 315A and 315B.

The Rx IP2 may comprise the 2nd-order intercept where the 1st-order output versus input curve may intercept with the 2nd-order intercept output versus input curve. The 2nd-order output versus input curve may represent the second order signals generated when a periodic signal is amplified in an RF system with a non-linear response, with the input signal represented by the following equation:

$$V_i(t) = A_0 \cos(\omega_1 t) + A_1 \cos(\omega_2 t) \quad \text{EQ. 1}$$

where the amplitude of the input signal is $A_0$, and the angular frequency is $\omega_0$ In a non-linear system with a gain K, the output signal may be described by:

$$v_o(t) = K \cdot v_i(t) \quad \text{EQ. 2}$$

The resulting output of practical amplifiers may be represented by:

$$v_o = K_0 + K_1 v_i + K_2 v_i^2 + \ldots = \Sigma_{n=0}^{\infty} K_n v_i^n \quad \text{EQ. 3}$$

Due to non-linearities in the amplifier, in instances where two tones of frequency $\omega_1$ and $\omega_2$ are applied to the input then, among others, a $2^{nd}$ order distortion product at frequency $\Delta\omega = \omega_1 - \omega_2$ may be generated as described by:

$$V_o(t) = \{k_2 * A_0 * A_1 + 3/2 * k_4 * A_0^3 * A_1 + 3/2 * k_4 * A_0 * A_1^3\} * \cos((\omega_2 - \omega_1)t) \quad \text{EQ. 4}$$

where $K_i$ may comprise the gain coefficients in EQ. 3 and $A_0$ and $A_1$ the amplitude of the two input signals in EQ. 1. The point at which this 2nd-order distortion intercepts with the desired signal in an output versus input plot is the 2nd-order intercept, or IP2. The calibration of IP2 may be accomplished by applying two test tones with frequencies $\omega_1$ and $\omega_2$ through the loopback path and measuring at the Rx path output the product at the angular frequency $\omega_2 - \omega_1$ and recalibrating the appropriate Rx path correction coefficients until the tone at freq $\omega_2 - \omega_1$ is minimized and the desired IP2 level is achieved.

Figure 3E:
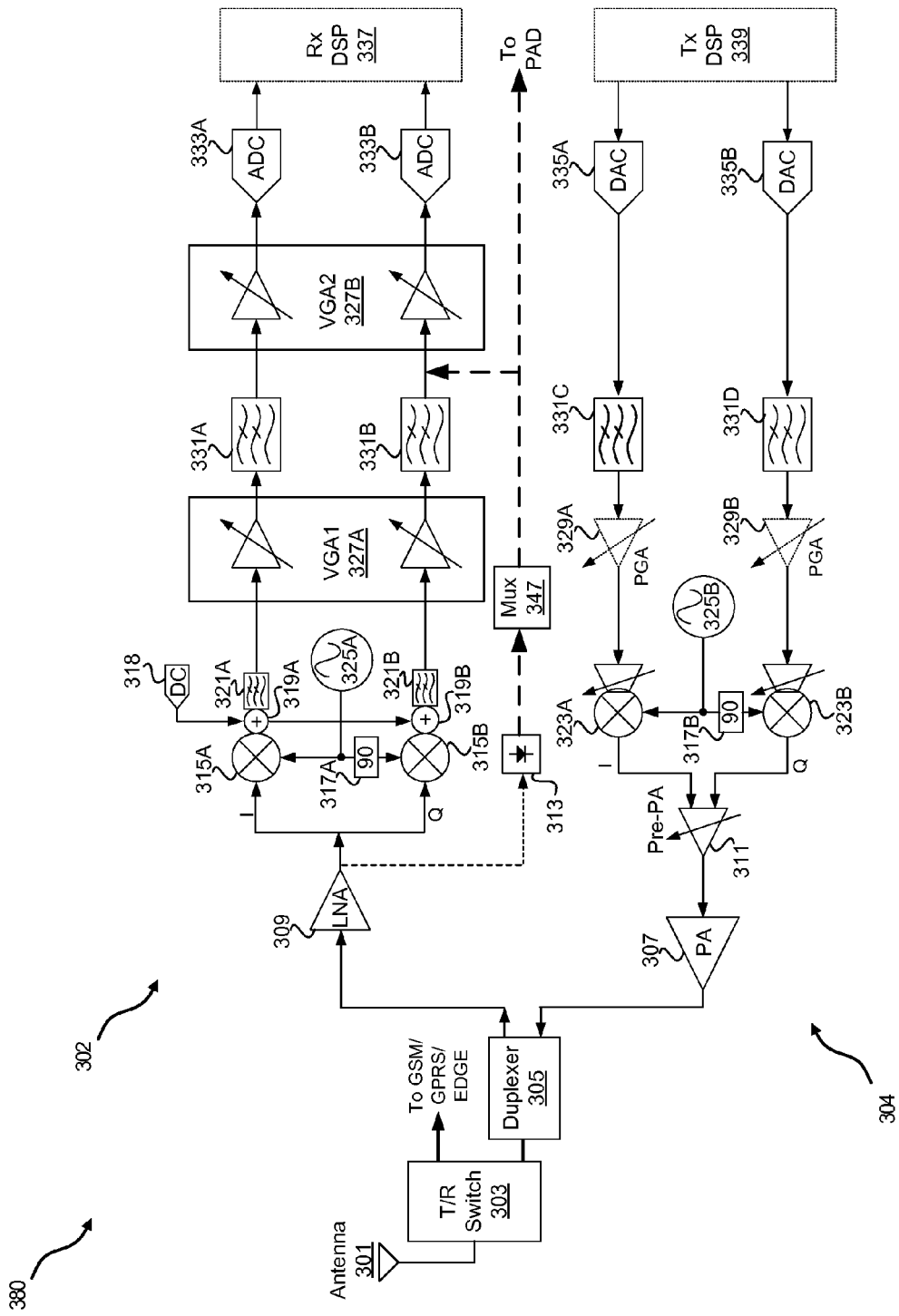
FIG. 3E is a block diagram illustrating an exemplary RSSI path calibration, in accordance with an embodiment of the invention.

FIG. 3E is a block diagram illustrating an exemplary RSSI path calibration, in accordance with an embodiment of the invention. Referring to FIG. 3E, there is shown an RSSI path calibration 380 comprising the antenna 301, the T/R switch 303, the duplexer 305, the power amplifier (PA) 307, the low-noise amplifier (LNA) 309, the pre-PA 311, the envelope detector 313, the mixers 315A and 315B, the 90 degree phase blocks 317A and 317B, the DC offset block 318, and the adders 319A and 319B. The Rx filter calibration 320 also comprises the low-pass filters (LPFs) 321A and 321B, the mixer/PGAs 323A and 323B, the LO generators 325A and 325B, the VGAs 327A and 327B, the PGAs 329A and 329B, the LPFs 331A-331D, the ADCs 333A and 333B, the DACs 335A and 335B, the Rx DSP 337, and the Tx DSP 339.

There is also shown a MUX 347, which may enable coupling of one of a plurality of Rx paths such as a high band (HB) and a low band (LB) LNA of each of the bands I-XV, for example, to the VGA2 327B, or to an external chip pad for level indication.

The envelope detector 313 may comprise, for example, a plurality of diodes which may be operable to measure the magnitude of a plurality of received signals, such as HB and LB signals.

In operation, a plurality of RF signals may be received by the antenna 301 and may be communicated to Rx paths, such as the Rx path 302 via the T/R switch 303 and the duplexer 305. The magnitude of the received signal at the output of the LNA 309 may be measured by the envelope detector 313 and communicated to the MUX 347, which may select from the plurality of envelope detector signals, such as HB or LB, for example, that may be communicated to the VGA2 327B or to an external chip pad. In this manner, the strength of blocker signals may be measured independent of the gain of the Rx path 302 prior to the VGA2 327B. The gain and current consumption of the Rx path 302 may be digitally adjusted to optimize signal strength and linearity received by the Rx DSP 337.

Figure 4:
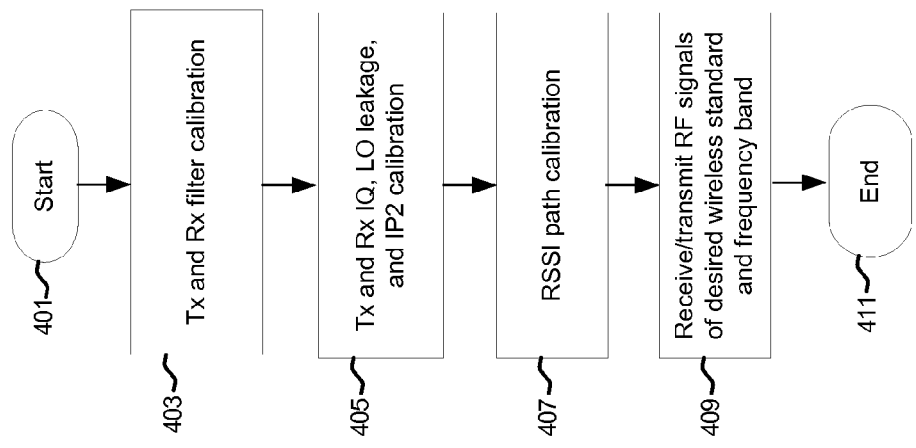
FIG. 4 is a flow diagram illustrating exemplary steps for calibrating a multi-mode, multi-standard transmitter and receiver, in accordance with an embodiment of the invention.

FIG. 4 is a flow diagram illustrating exemplary steps for calibrating a multi-mode, multi-standard transmitter and receiver, in accordance with an embodiment of the invention. In step 403, after start step 401, the Tx and Rx filters 331A-331D may be calibrated by generating calibration signals that may be fed directly through the filters, followed by step 405 where I and Q mismatch, LO leakage, and IP2 may be calibrated by communicating a Tx path signal into an Rx path following the mixers 315A-315B and/or by communicating a Tx path signal into a Tx path prior to the LNA in the Rx path, such as the LNA 309 in the Rx path 302. In step 407, the RSSI path may be calibrated by communicating a signal received by the antenna 301 to the VGA2 327B following the Rx path 302 down-conversion and low pass filtering, and adjusting Rx path 302 gain and current for desired blocker signal mitigation and linearity. In step 409, RF signals may be transmitted and received utilizing the calibrated Rx and Tx parameters, followed by end step 411.

In an embodiment of the invention, a method and system is described for calibrating a multi-mode, multi-standard transmitter and receiver. In various aspects of the invention, A plurality of calibration paths may be configured in a transceiver on a chip comprising a plurality of transmitter (Tx) Tx1-Tx4 and 304 and receive (Rx) paths Rx1-Rx7 and 302. Second order intercept point (IP2) distortion may be calibrated for the plurality of the Rx paths Rx1-Rx7 and 302 utilizing a plurality of phase locked loops in the chip 210 and the plurality of configurable calibration paths. Local oscillator leakage, Rx path DC offset and RSSI, Tx and Rx in-phase (I) and quadrature-phase (Q) mismatch, and Tx and Rx path filters 208A-208F may be calibrated utilizing the plurality of configurable calibration paths. Cutoff frequency of the filters 208A-208F in the Tx and Rx paths may be calibrated. Blocker signals may be mitigated by calibrating one or more amplifier gains in the plurality of Rx paths Rx1-Rx7 and 302. The calibration paths may comprise an envelope detector 313. One or more of local oscillator leakage and I and Q mismatch may be mitigated utilizing pre-distortion generated by an on-chip digital signal processor 339 in the plurality of Tx paths Tx1-Tx4 and 304.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for calibrating a multi-mode, multi-standard transmitter and receiver.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in a multi-band, multi-standard wireless transceiver comprising a transmitter (Tx) path, a receiver (Rx) path, and a plurality of calibration paths between said Tx path and said Rx path:
   sending two test tones of different frequencies from said Tx path to said Rx path over a first one of said plurality of calibration paths, wherein said first one of said plurality of calibration paths is coupled to said Tx path between an output of a mixer and an input of a power amplifier and coupled to said Rx path between an output of an antenna and an input of a low noise amplifier;
   measuring a processed result of said two test tones at an output of said Rx path;
   adjusting a mixer in said Rx path based on said processed result to calibrate for second-order intercept point distortion; and
   before sending said two test tones of different frequencies from said Tx path to said Rx path over said first one of said calibration paths, calibrating a filter in said Tx path using a second one of said plurality of calibration paths and calibrating a filter in said Rx path using a third one of said plurality of calibration paths.

2. The method according to claim 1, comprising calibrating local oscillator leakage using said plurality of calibration paths.

3. The method according to claim 1, comprising calibrating one or more amplifier gains in said Rx path to mitigate blocker signals.

4. The method according to claim 1, comprising calibrating a DC offset in said Rx path using said plurality of calibration paths.

5. The method according to claim 1, comprising calibrating received signal strength for said Rx path using said plurality of calibration paths.

6. The method according to claim 1, wherein said second one of said plurality of calibration paths is coupled to said Tx path after an output of said filter in said Tx path and is coupled to said Rx path after an output of said filter in said Rx path.

7. The method according to claim t, wherein calibrating said filter in said Tx path comprises calibrating a cutoff frequency of said filter in said Tx path.

8. The method according to claim 1, wherein one or more of said calibration paths comprise an envelope detector.

9. The method according to claim 1, comprising mitigating local oscillator leakage using pre-distortion generated by an on-chip digital signal processor in said Tx path.

10. A system for processing signals, the system comprising:
   one or more circuits for use in a multi-band, multi-standard wireless transceiver comprising a transmitter (Tx) path, a receiver (Rx) path, and a plurality of calibration paths between said Tx path and said Rx path, wherein said one or more circuits are configured to:
   send two test tones of different frequencies from said Tx path to said Rx path over a first one of said plurality of calibration paths, wherein said first one of said plurality of calibration paths is coupled to said Tx path between an output of a mixer and an input of a power amplifier and coupled to said Rx path between an output of an antenna and an input of a low noise amplifier;
   measure a processed result of said two test tones at an output of said Rx path;

adjust a mixer in said Rx path based on said processed result to calibrate for second-order intercept point distortion, and before sending said two test tones of different frequencies from said Tx path to said Rx path over said first one of said calibration paths, calibrate a filter in said Tx path using a second one of said plurality of calibration paths and calibrate a filter in said Rx path using a third one of said plurality of calibration paths.

11. The system according to claim 10, wherein said one or more circuits are configured to calibrate local oscillator leakage using said plurality of calibration paths.

12. The system according to claim 10, wherein said one or more circuits are configured to calibrate one or more amplifier gains in said Rx path to mitigate blocker signals.

13. The system according to claim 10, wherein said one or more circuits are configured to calibrate a DC offset in said Rx path using said plurality of calibration paths.

14. The system according to claim 10, wherein said one or more circuits are configured to calibrate received signal strength for said RX path using said plurality of calibration paths.

15. The system according to claim 10, wherein said second one of said plurality of calibration paths is coupled to said Tx path after an output of said filter in said Tx path and is coupled to said Rx path after an output of said filter in said Rx path.

16. The system according to claim 10, wherein said one or more circuits are configured to calibrate a cutoff frequency of said filter in said Tx path.

17. The system according to claim 10, wherein one or more of said plurality of calibration paths comprise an envelope detector.

18. The system according to claim 10, wherein said one or more circuits are configured to mitigate local oscillator leakage using pre-distortion generated by an on-chip digital signal processor in said Tx path.

19. The system according to claim 10, wherein the second-order intercept point distortion is caused by leakage from said Tx path.

20. A method comprising:

sending two test tones of different frequencies over a first calibration path coupled to a transmitter (Tx) path between an output of a mixer and an input of a power amplifier and coupled to a receiver (Rx) path between an output of an antenna and an input of a low noise amplifier;

measuring a processed result of said two test tones at an output of said Rx path;

adjusting a mixer in said Rx path based on said processed result to calibrate for second-order intercept point distortion caused by leakage from said Tx path; and before sending said two test tones of different frequencies from said Tx path to said Rx path over said first calibration path, calibrating a filter in said Tx path using a second calibration path and calibrating a filter in said Rx path using a third calibration path.

* * * * *

UNITED STATES PATENT AND TRADEMARK OFFICE
CERTIFICATE OF CORRECTION

PATENT NO. : 9,065,537 B2  
APPLICATION NO. : 12/427564  
DATED : June 23, 2015  
INVENTOR(S) : Georgantas et al.

Page 1 of 1

It is certified that error appears in the above-identified patent and that said Letters Patent is hereby corrected as shown below:

Claims

In column 16, line 43, replace "claim t" with --claim 1--.

Signed and Sealed this
Twenty-ninth Day of March, 2016

Michelle K. Lee
*Director of the United States Patent and Trademark Office*